United States Patent

[11] 3,624,802

[72] Inventor  Roger Louis Ripert
        Concord, Calif.
[21] Appl. No. 50,841
[22] Filed    June 29, 1970
[45] Patented Nov. 30, 1971
[73] Assignee Grove Valve and Regulator Company

[54] FLOATING STEM SEAL ASSEMBLY
    5 Claims, 1 Drawing Fig.
[52] U.S. Cl. .................................................. 251/31,
                                    251/62, 251/326, 92/167
[51] Int. Cl. .......................................................F16k31/143
[50] Field of Search............................................ 251/326,
                                    31, 62, 329, 63.5; 92/167

[56] References Cited
UNITED STATES PATENTS

| | | | |
|---|---|---|---|
| 1,747,968 | 2/1930 | Braren............................ | 92/167 X |
| 3,172,639 | 3/1965 | Grove............................. | 251/329 |
| 3,379,405 | 4/1968 | Natho............................. | 251/31 |
| 3,556,472 | 1/1971 | Grove............................. | 251/326 X |

*Primary Examiner*—Arnold Rosenthal
*Attorney*—Melvin R. Stidham

ABSTRACT: A gate valve operated by a pressure-fluid-actuated ram with a piston mounted on the end of the stem. The stem is slidably received in stem seal assemblies on the valve bonnet and the fluid cylinder, with the valve stem seal assembly being in a floating mount to facilitate alignment with the valve stem seal while maintaining the integrity of the fluid seal.

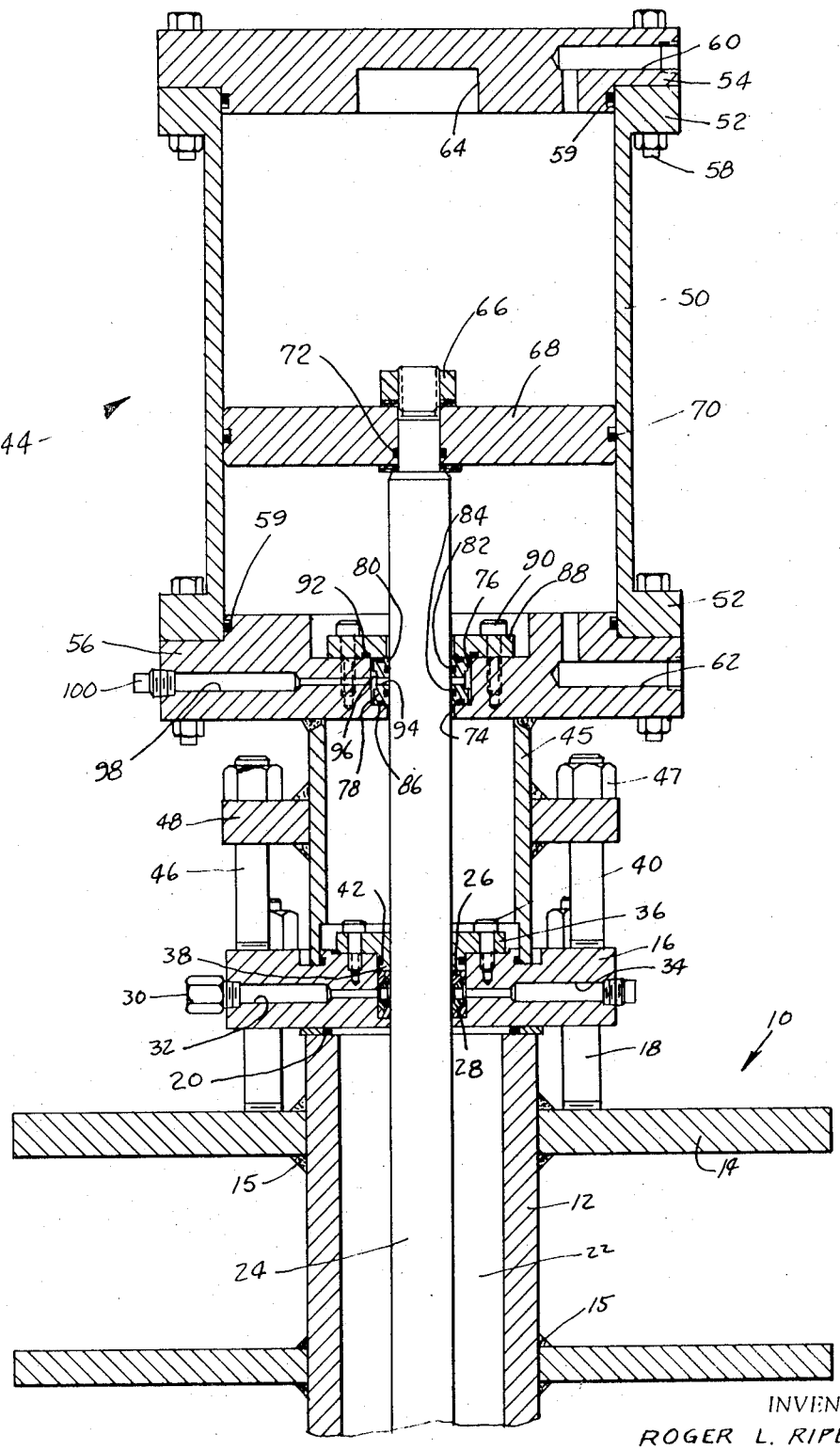

FLOATING STEM SEAL ASSEMBLY

BACKGROUND OF THE INVENTION

The invention relates to a stem seal for a cylinder operator for a valve and, more particularly, to a floating seal assembly in a fluid cylinder for a valve stem that extends through sealed bearings in a valve bonnet.

Some valves, such as gate valves, may be operated automatically by means of a pressure-fluid cylinder, such as a hydraulic ram. In such case, the piston of the ram may be mounted directly onto the valve stem. But, because the stem is slidably received in sealed bearings on the valve bonnet, there is a rather stringent requirement for precision in alignment of the fluid cylinder bearing in order to prevent binding and to maintain the integrity of the cylinder seal.

OBJECTS OF THE INVENTION

It is an object of this invention to alleviate the need for precision alignment of the fluid cylinder stem seal in hydraulically operated reciprocating valves, such as gate valves.

It is a further object of this invention to provide a stem seal for a hydraulic ram valve operator which may be adjusted radially while maintaining an effective seal.

Other objects and advantages of this invention will become apparent from the detailed description to follow when read in conjunction with the accompanying drawing.

BRIEF DESCRIPTION OF THE DRAWING

The drawing is a vertical section view of the upper portion of a gate valve with a hydraulic cylinder mounted thereon.

DESCRIPTION OF A PREFERRED EMBODIMENT

Referring now more particularly to the drawing, there is shown the upper portion of a gate valve 10 including a body tube 12 of generally rectangular cross section, which may be formed of plates, angles or other rolled shapes. The body tube 12 may be reinforced by a series of hooplike ribs 14 welded at 15 around it. A bonnet plate 16 is secured to the top of the valve body tube 12 as by means of studs 18, with suitable gasket means 20 being provided to seal the valve interior 22.

Around the valve stem 24 a recess 26 is provided in the bonnet plate to receive a suitable stem packing 28 of V-seals or the like, and a fitting 30 may be provided for introduction of a lubricant through the duct 32 and into the packing recess 26. An opposing duct 34 may be provided to exhaust entrapped air as the lubricant is introduced. A retainer cap 36 with a packing gland boss 38 is secured to a bonnet plate 16, as by means of cap screws 40, with a seal being effective by means of an O-ring 42.

The hydraulic operator 44 may be mounted on a yoke 45 and secured to the valve bonnet plate 16 as by means of tightening nuts 47 on studs 46 which extend THROUGH a flange 48, which is welded around the yoke 45. The hydraulic operator 44 includes a cylinder 50 with end flanges 52 to which are secured the upper and lower end closures 54 and 56, as by means of suitable bolts 58. The opposite ends of the cylinder are sealed by means of O-rings 59. Hydraulic fluid ducts 60 and 62 are drilled in the upper and lower end closures, respectively, to provide for intake and exhaust of hydraulic fluid.

A depression 64 is provided in the top closure 54 in order to accommodate a retainer nut 66 threaded to the upper end of the stem 24 to secure the piston 68 in place thereon. An O-ring 70 may be provided to seal around the piston, and a smaller O-ring 72 is provided to seal around the stem 24. The top closure 54 may function as a stop to determine the open position of the valve 10.

In order to seal around the valve stem at the lower closure plate 62, the plate is bored at 74 to accommodate the valve stem 24 freely, and is counterbored at 76 in order to receive the seal sleeve 78 freely. The seal sleeve is bored at 80 to fit snugly around the stem 24 and is provided with spaced upper and lower O-rings 82 and 84 in order to effect the stem seal. Face seal O-rings 86 are provided in the opposite annular faces of the sleeve 78 in order to seal against the bottom of the counterbore and against the under surface of the retainer plate 88, irrespective of any radial displacement caused by any slight misalignment with the valve bonnet seal 28. The retainer plate 88 is secured to the lower end closure plate 56 by means of cap screws 90 and O-ring 92 is provided to seal against any leakage under the retainer plate 88.

The seal sleeve 78 has a plurality of radial holes 94 that open into an annular slot 96 in the outer surface thereof. The annular slot in turn, opens into communication with a leakage detection duct 98 which is normally closed by means of a plug 100. Hence, the effectiveness of the upper stem O-ring may be determined at any time by removing the plug. If there is any leakage within the duct, it will become readily apparent that the upper O-ring requires replacement.

In assembly, the bottom cylinder closure 56 and yoke 45 may be placed over the valve stem 24 and secured in place by tightening the nuts 47 on the studs 46. Then the stem seal sleeve 78, with O-rings 82, 84 and 86 in place is slipped over the stem 24 and allowed to locate itself within the clearance recess 76, dependent upon the radial position of the stem 24 in the bore 74 of the bottom cylinder closure. After the retainer plate 88 is inserted over the stem and bolted in place, assembly of the piston 68 and the cylinder 44 may be completed.

While this invention has been described in conjunction with a preferred embodiment thereof, it is obvious that modifications and changes therein may be made by those skilled in the art without departing from the spirit and scope of this invention.

What is claimed is:

1. In a valve construction comprising:
   a valve body with flow passageways therethrough,
   a valve closure member movable transversely of said flow passageways between blocking and unblocking positions relative thereto,
   an axially movable valve stem connected to said valve closure member to impart movement thereto,
   a valve bonnet slidably receiving said valve stem,
   a pressure fluid cylinder mounted on said valve body, including a cylinder housing end wall opposing said valve bonnet,
   said valve stem extending freely through said housing wall, and
   a piston in said cylinder connected to said stem, The improvement comprising:
   an enlarged recess in said housing end wall around said valve stem forming a first planar surface extending radially of said stem,
   a sleeve slidably received on said stem and loosely received in said recess,
   a seal ring on the inner surface of said sleeve sealing around said stem,
   a retainer plate secured to said housing end wall around said valve stem with a second planar surface thereon holding said sleeve in said recess, and
   a seal ring on and end surface of said sealing against one of said planar surfaces.

2. The combination defined by claim 1 including:
   a seal ring on said end wall around said recess.

3. The combination defined by claim 1 including:
   a seal ring on the other end of said sleeve sealing against the other planar surface.

4. The combination defined by claim 1 including:
   a second stem seal ring on the inner surface of said sleeve spaced from the first seal ring,
   leak holes through said sleeve intermediate said stem seal rings, and,
   a leak detector duct through said one wall opening into said recess.

5. The combination defined by claim 4 including:
   an annular groove around the outer surface of said sleeve, said leak holes opening into said groove.

* * * * *

UNITED STATES PATENT OFFICE
CERTIFICATE OF CORRECTION

Patent No. 3,624,802          Dated  November 30, 1971

Inventor(s)  Roger Louis Ripert

It is certified that error appears in the above-identified patent and that said Letters Patent are hereby corrected as shown below:

Column 2, line 63, after "said", first occurrence, insert -- plate engaging said --.

Signed and sealed this 23rd day of May 1972.

(SEAL)
Attest:

EDWARD M. FLETCHER, JR.            ROBERT GOTTSCHALK
Attesting Officer                  Commissioner of Patents